United States Patent [19]

Friedman et al.

[11] Patent Number: 4,888,593

[45] Date of Patent: Dec. 19, 1989

[54] TIME DIFFERENCE OF ARRIVAL GEOLOCATION METHOD, ETC.

[75] Inventors: Joseph S. Friedman, Baltimore; John P. King; Joseph P. Pride, III, both of Ellicott City, all of Md.

[73] Assignee: Signal Science, Inc., Santa Clara, Calif.

[21] Appl. No.: 147,255

[22] Filed: Dec. 15, 1987

[51] Int. Cl.$^4$ .............................................. G01S 1/24
[52] U.S. Cl. ................................. 342/387; 342/375; 342/382
[58] Field of Search .................... 342/387, 382, 375

[56] References Cited

U.S. PATENT DOCUMENTS

| | | |
|---|---|---|
| 3,196,439 | 7/1965 | Byatt . |
| 3,870,998 | 3/1975 | Dewey et al. . |
| 4,000,466 | 12/1976 | Scouten et al. . |
| 4,198,634 | 4/1980 | Jernigan et al. . |
| 4,204,655 | 5/1980 | Gulick et al. .................... 244/3.19 |
| 4,486,757 | 12/1984 | Ghose et al. . |
| 4,638,321 | 1/1987 | Drogin . |

OTHER PUBLICATIONS

Boyles et al., "Cycloergodic Properties of Discrete-Parameter Nonstationary Stochastic Processes", IEEE Transactions on Information Theory, vol. IT-29, No. 1, Jan. 1983, pp. 105-114.

Primary Examiner—Theodore M. Blum
Attorney, Agent, or Firm—Laubscher Presta & Laubscher

[57] ABSTRACT

A direction finding method and apparatus for a radio signal source, modulated by a digital information signal and existing in a heavy interference environment, is based on cyclic crosscorrelation. The direction finding technique exploits the second order periodicity of a transmitted signal having digital modulation, whereby the technique is immune to narrow-band interference. Radio frequency signals are received by two spaced antennas, and the signal of interest can be considered as a cyclostationary process. The signal time of arrival difference between the two antennas is determined using a cyclic crosscorrelation method. This is implemented by sending the electrical signals, developed by the antennas, through a variable delay device, then to a balanced mixer. The composite signal from the mixer is sent to a band-pass filter whose center frequency is equal to the baud rate of the signal of interest. The output energy of the filter is proportional to that portion of the cyclic crosscorrelation function where the cyclic frequency corresponds to the baud rate. With the use of a peak detector, which finds the peak values of the cyclic crosscorrelation function, the time difference of arrival between the two antennas is determined. This, in turn, determines a line of position to the radio source.

17 Claims, 6 Drawing Sheets

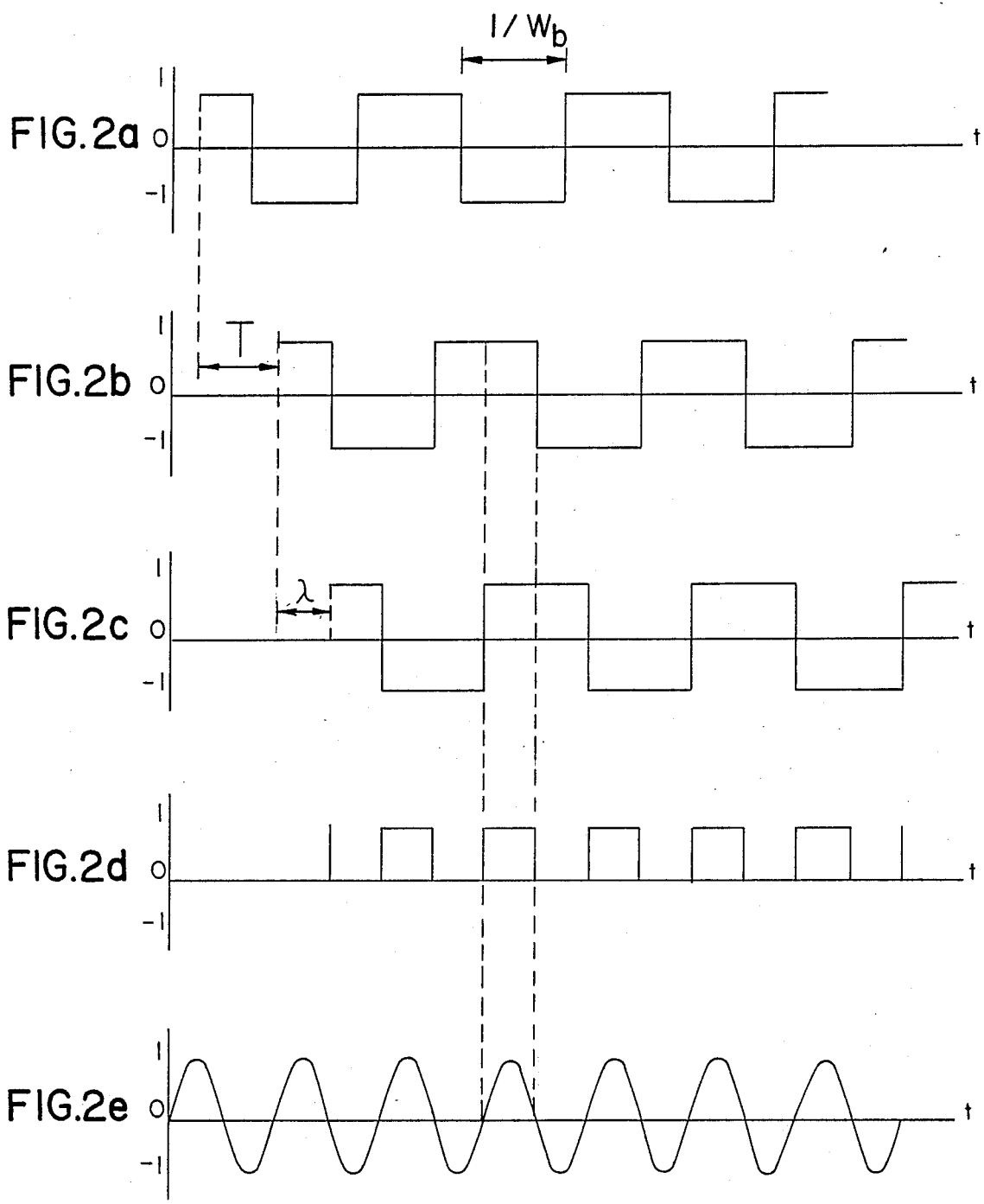

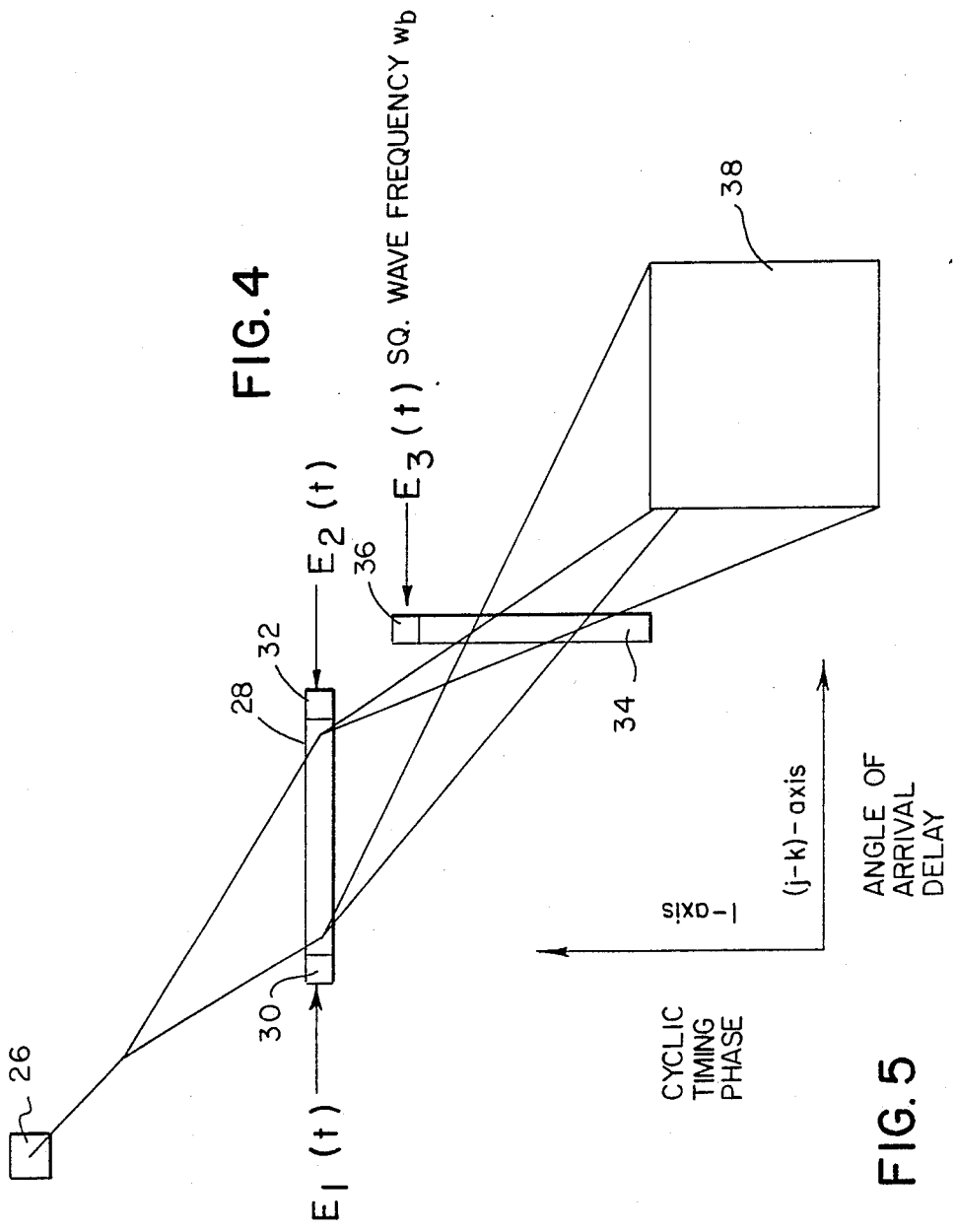

TIME DIFFERENCE OF ARRIVAL GEOLOCATION METHOD, ETC.

The Government has rights in this invention pursuant to Contract No. MDA 904-81-C-7005, awarded by the Maryland Procurement Office.

BACKGROUND OF THE INVENTION

The present invention relates to a method and apparatus for direction finding and, more specifically, to systems for determining the line of position to a distant radio transmitter. The needs for determining the location of a radio transmitter are varied. A boat, for instance, may have an emergency, constant-frequency transmitter, and search parties must be able to pinpoint the transmitter's location in order to effect a rescue. As a navigation aid, radio transmitters are provided for boats and airplanes at selected locations and the boat or airplane carries equipment for determining the radio transmitter location in order to determine its position relative to the surrounding land.

BRIEF DESCRIPTION OF THE PRIOR ART

In general, prior and current techniques for determining the bearing angle of a radio transmitter relative to an observer include the use of gain patterns of a rotating antenna or measurement of the very small time difference between the arrival of a radio frequency wavefront from the transmitter at one antenna and its arrival at another antenna. All of these measurement techniques suffer from limitations posed by interference from other signals within a similar frequency range.

With the rotating antenna technique, the line of position is determined to be a straight line in the direction of the strongest signal power. However, a second interfering signal of like frequency and a different angle of arrival may be sufficiently strong to offset the advantages of directional antenna gain and produce an erroneous measurement.

With the time difference technique (generally referred to as phase interferometry) the two antennas are held at the observing location a fixed distance from each other. The bearing angle of the radio wavefront relative to the two antennas is related to the measured difference in time of arrival by an inverse sine function. If the relative phase difference between two electrical signals developed by the radio wavefront in the two antennas is determined through measurement, a bearing angle may be calculated with the measurements at hand. Again, an interfering signal of like frequency will cause appreciable errors. In this case, the reported bearing angle will be a power-weighted average of the two incoming bearing angles.

A second time difference technique in general use is commonly called the Time Difference of Arrival (TDOA) method. With this method, two observing antennas are again held a fixed distance from each other. These distances are typically much larger than is the case with the previous time difference technique. Receivers with predetection outputs are then attached to the two antennas, and the two resultant outputs are crosscorrelated. The peak output from the crosscorrelation is a measure of the TDOA between the observation points. A line of position may be calculated from the crosscorrelation peak. In the case of a wide-band signal of interest (SOI) in an environment of narrow-band interference, the determination of the crosscorrelation peak is extremely difficult and often impossible due to equipment limitations. This is particularly true if the interference is of smaller bandwidth than the SOI. Such interference then has a broad crosscorrelation function which typically obscures the correlation function of the SOI.

With each of the above techniques, interference must be removed by additional means in order to successfully determine the location of the signal of interest. These additional means add to system cost and complexity. The present invention was developed in order to overcome these and other drawbacks of the prior techniques by providing a direction finding method and apparatus which internally reduces or minimizes interference effects. The invention, which is referred to as a Cyclic Time Difference of Arrival (CTDOA) technique, utilizes the cyclic crosscorrelation function to determine the time difference of arrival of the received signal of interest at different antennas. The signal of interest can be considered as a cyclostationary process which has been discussed by W. A. Gardner in "Stationarizable Random Processes", IEEE Transactions on Information Theory, June 1978 and by Gardner and Boyles in "Cycloergodic Properties of Discrete-Parameter Nonstationary Stochastic Processes", IEEE Transactions on Information Theory, January 1983.

SUMMARY OF THE INVENTION

Accordingly, it is a primary object of the present invention to provide a method and apparatus for determining the geographical location of a signal transmitter relative to a receiver wherein first and second spaced antennas receive modulated signals having a given baud rate from the transmitter. The antennas generate first and second electrical signals, respectively, corresponding with the signals received thereby, with the second signal being delayed in time from the first signal. A processing circuit is connected with the outputs of the first and second antennas and produces an output signal proportional to the time difference between the first and second signals. The processing circuit includes a variable time delay device connected with the first antenna for delaying the first electrical signal by a variable time. A multiplier is connected with the output of the variable time delay device and the second antenna for multiplying and mixing the variable time delayed first signal and the second signal to produce a combined signal output. The cyclic crosscorrelation function of the combined signal output is generated in accordance with the transmitted signal baud rate and the variable time delay applied to the first electrical signal. As the time delay is varied, the cyclic crosscorrelation function determines the time difference of arrival of the received signals.

According to a more specific object of the invention, a band pass filter and peak detector are provided to generate an estimate of the cyclic crosscorrelation function of the combined signal. The center frequency of the filter is matched to the baud rate of the signal of interest. The baud rate of a digital signal is the frequency at which a symbol (i.e. 0 or 1) is produced. The peak detector examines the output of the band pass filter as various delays are introduced between the first and second signals by the variable time delay device. The output of the peak detector is proportional to an estimate of the cyclic crosscorrelation function. Specifically, the output is related to that portion of the cyclic crosscorrelation function corresponding to the baud rate of the signal of interest and to the time delay imposed by the delay device. As the delay is varied, the peak detector output generates two maxima with a null in between the maxima. The null between the maxima corresponds to the TDOA between observing positions, and the time interval between maxima will be equal to one baud period.

According to yet another object of the invention, first and second Bragg cells arranged normal to each other are provided to optically modulate the first and second electrical signals to apply the variable time delay to at least one of the signals.

According to a further object of the invention, an error correction circuit is provided for automatic tracking and fine adjustment of the variable time delay. More particularly, a second processing circuit delays the two antenna signals by an additional amount. The difference voltage between the first and second processing circuits is used as an error control signal to adjust the first time delay. The first delay is adjusted so that the error signal is zero and the outputs of the two processing circuits are equal. This occurs when the delays introduced by the two processing circuits straddle the actual delay of interest.

BRIEF DESCRIPTION OF THE FIGURES

Other objects and advantages of the subject invention will become apparent from a study of the following specification when viewed in the light of the accompanying drawing, in which:

FIGS. 2a-2e are timing diagrams for the operation sequence of the apparatus of FIG. 1;

FIG. 4 is a partial block diagram of an alternate embodiment of the invention using optical processing for applying a variable time delay;

FIG. 5 is a delay diagram representing the axial arrangement of the optical system of FIG. 4;

DETAILED DESCRIPTION

Figure 1:
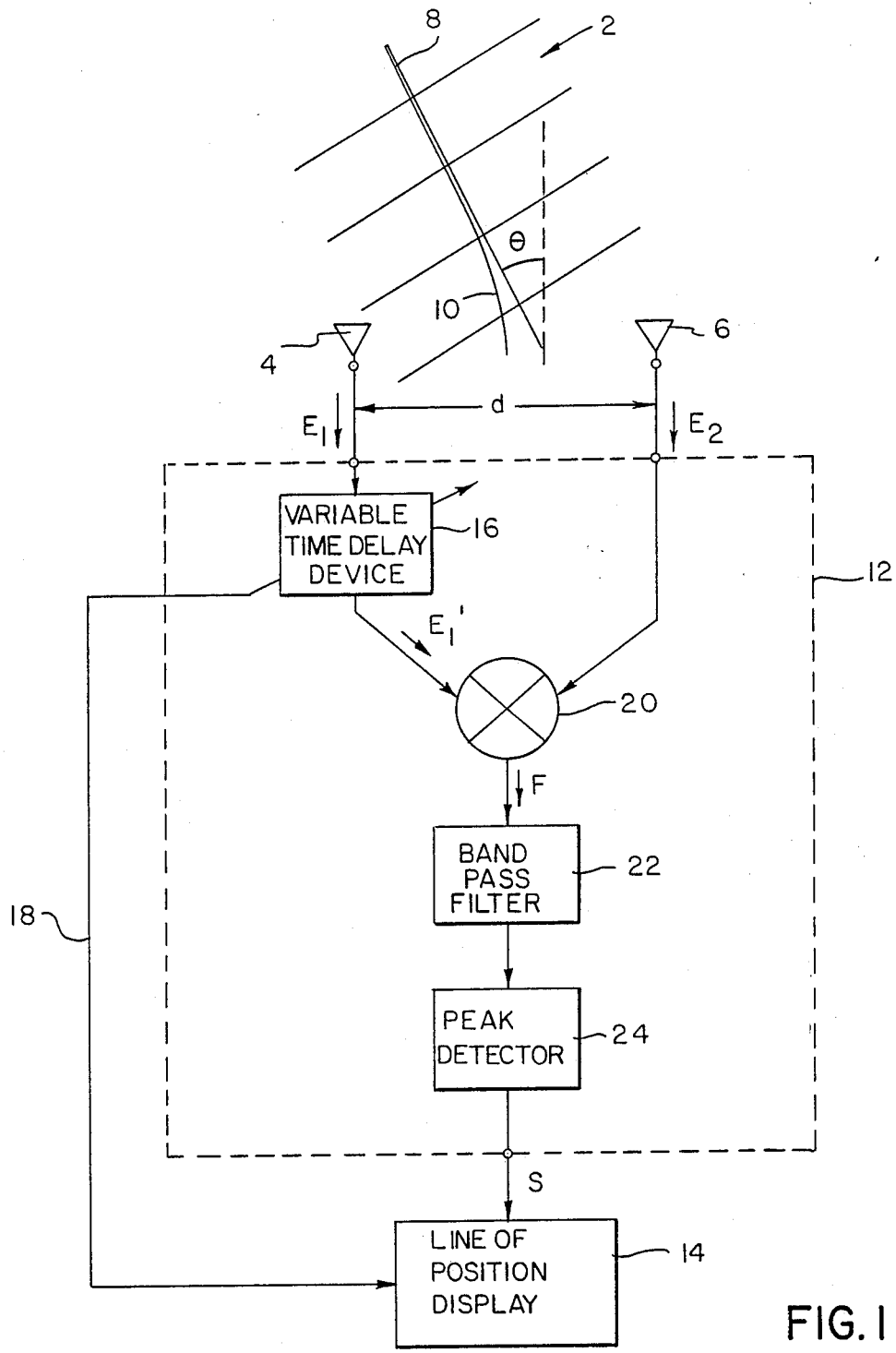
FIG. 1 is a block diagram of a first embodiment of the apparatus for determining time difference of arrival using the cyclic crosscorrelation function of the signal of interest according to the invention.

The apparatus for determining the time difference of arrival of signals from a transmitter to determine the location or line of position of the transmitter relative to a receiver is shown in FIG. 1. The transmitted signal of interest is represented as an electromagnetic energy wavefront 2. The wavefront may be within the radio frequency portion of the electromagnetic energy spectrum and has a carrier frequency of $W_c$ which has a modulation at a baud rate of $W_b$.

The receiver includes a first antenna 4 and a second antenna 6 which are separated by a given distance d. Owing to the direction of propagation of the wavefront 2 as shown by the line 8, the wavefront is initially received by the first antenna 4 and subsequently received by the second antenna 6. For each delay in time of arrival of a radio frequency wavefront, there is a hyperbolic line of position 10, a subset of which is desired to be determined by the present invention. More particularly, the wavefront 2 will strike the antennas 4, 6 at different times unless the bearing angle $\theta$ is equal to 0. It is this difference in time of arrival of the wavefront at the first and second antennas that may be determined directly by the electronic equipment, since this time difference is proportional to the line of position by a hyperbolic function. The signals received by the first and second antennas are time varying electrical signals $E_1$ and $E_2$ possessing a baud rate $W_b$ and are equal except for the time delay between the two signals. This time delay T is also proportional to the line of position 10. The determination of the time difference T between the signals by electronic equipment also permits the determination therefrom of the desired ultimate quantity, i.e. the line of position.

The signals $E_1$ and $E_2$ from the antennas 4, 6, respectively, are delivered to an electronic signal processing circuit 12 which produces an output signal S that is proportional to the time difference T between the signals $E_1$ and $E_2$. The output signal S is supplied to a conventional line of position device 14 which may be adjusted to respond to the signal S and to display the line of position directly.

The processing circuit 12 includes a variable time delay device 16 connected with the output of the first antenna 4 to variably delay the first signal $E_1$. The delay device 16 also provides an input to the line of position device 14 via a line 18 to correlate a specific delay value with the signal S as the delay device 16 is varied throughout its range. Furthermore, the amount of delay introduced by the delay device 16 may be monitored via the line 18. Accordingly, the signal $E_1'$ output from the delay device 16 has a delay relative to the second signal $E_2$ consisting of the difference between the delay due to the different time of arrivals and the delay introduced by the variable time delay device 16.

The signals $E_1'$ and $E_2$ are delivered to a balanced mixer 20 which multiplies the signals to produce a combined output signal F which contains signals at two times the basic carrier frequency, at the frequency of the baud rate, and at various other frequencies related to the electromagnetic energy wavefront 2.

A band pass filter 22 is connected with the output of the mixer 20 and is tuned to pass that portion of the combined output signal F at the frequency of the baud rate of the signal of interest 2. The output of the filter 22 thus contains only a signal at the frequency of the baud rate. This output is connected with a peak detector or integrator circuit 24. The signal at the frequency of the baud rate has its amplitude depend on the relative time difference between the two signals $E_1'$ and $E_2$, before they were multiplied together by the mixer 20. The amplitude peaks when the time difference corresponds to plus or minus one half the baud period, and the amplitude will reach a null when the time difference is 0. Therefore, in coordination with the peak detector 24, the variable time delay device 16 sweeps a time delay over the appropriate range to find the two peaks and the null. At the point where the peak detector 24 reaches the null, the delay introduced by the variable delay device 16 will be equal to the delay due to the differences of arrival.

The preferred embodiment of the invention of FIG. 1 detects the positions of the peaks, and the null which is half way between the peaks. All three points of information, and related knowledge of the signal parameters, are used to determine delay times for which the peaks and nulls occurred. The output signal S from the peak detector 24 transfers the value of the signal for the three delays introduced by the delay device 16 to provide the peaks and intervening null to the line of position device 14 for bearing angle display. Likewise, the pertinent values for the nulls may be transferred by the line 18 to the display 14.

FIGS. 2a-2e represent a timing diagram for operation of the apparatus shown in FIG. 1 for a time t. More particularly, FIG. 2a indicates the signal modulation that is superimposed onto the electromagnetic energy signal as it arrives at the first antenna 4. FIG. 2b illustrates the signal modulation superimposed on the electromagnetic energy signal as it arrives at the second antenna 6. It will be noted that the signals in FIGS. 2a and 2b are equal but for a relative time difference T. This time difference T is related to the line of position 10 of the signal transmitter to the first and second antennas by a hyperbolic function as shown in FIG. 1. The baud rate $W_b$ of the signal is shown in FIG. 2a.

FIG. 2c illustrates the signal modulation that is superimposed onto a carrier frequency signal $E_1'$ at the output of the variable time delay device 16. The relative delay of the signal has been altered by a time period $\lambda$ by the variable time delay device 16.

The output signal F from the mixer 20 is shown in FIG. 2d. The mixer not only combines the modulated signals shown in FIGS. 2a and 2c but also the carrier frequencies associated with the modulations of interest and any interference picked up by the first and second antennas. Thus the signal F contains a multitude of signals comprising various combinations of interference and desired signals.

FIG. 2e illustrates the frequency of interest among the various signals contained in the output signal F. It is the fundamental frequency component of the signal illustrated in FIG. 2d when the relative difference between the signals of FIGS. 2b and 2c is one half of the baud period. The amplitude of this fundamental component is at the maximum only when the time difference between the signals $E_1'$ and $E_2$ corresponds to one half the baud period. The frequency of this signal of interest is also exactly equal to the baud rate of the signal expressed in Hertz. Interference with other baud rates has a negligible energy contribution at the frequency of the signal baud rate. Thus a band pass filter 22, centered on the baud rate, is used to block the energy related to delays between the two signals. The peak detector 24 monitors the amplitude of the signal at the baud frequency at the output of the filter for the corresponding delay due to differences in time of arrival.

Figure 3A:
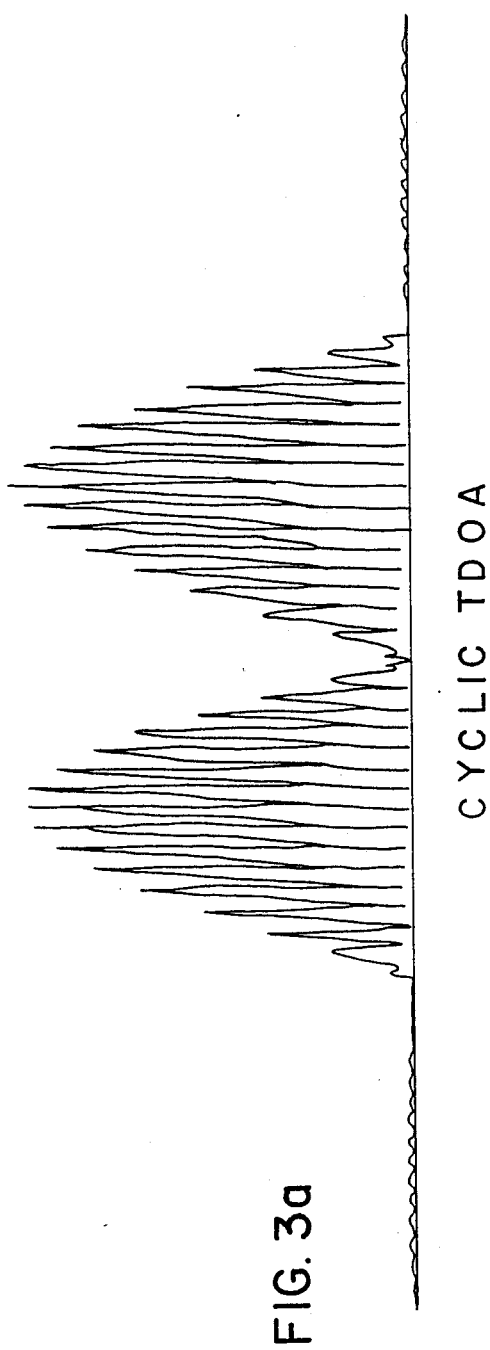
FIGS. 3a and 3b are graphical representations of signal amplitudes detected according to the invention and the prior techniques, respectively.

FIG. 3a illustrates the amplitude of the signal passed by filter 22 as various delays are introduced relative to the signals $E_1'$ and $E_2$. The peak detector 24 analyzes these amplitudes and determines the delay corresponding to the null between the two peaks. This null corresponds to the situation where the variable time delay device 16 is compensating exactly for the time of arrival delay, and the resulting two signals are delayed by exactly one half baud with respect to each other. The delay information is passed onto the line of position display 14. Appropriate weighting may be applied to the display device 15 to display the line of position directly, or a chart may accompany a direct reading of the amplitudes, as shown on FIG. 3A, so that an operator may convert such an amplitude to a line of position.

Figure 3B:
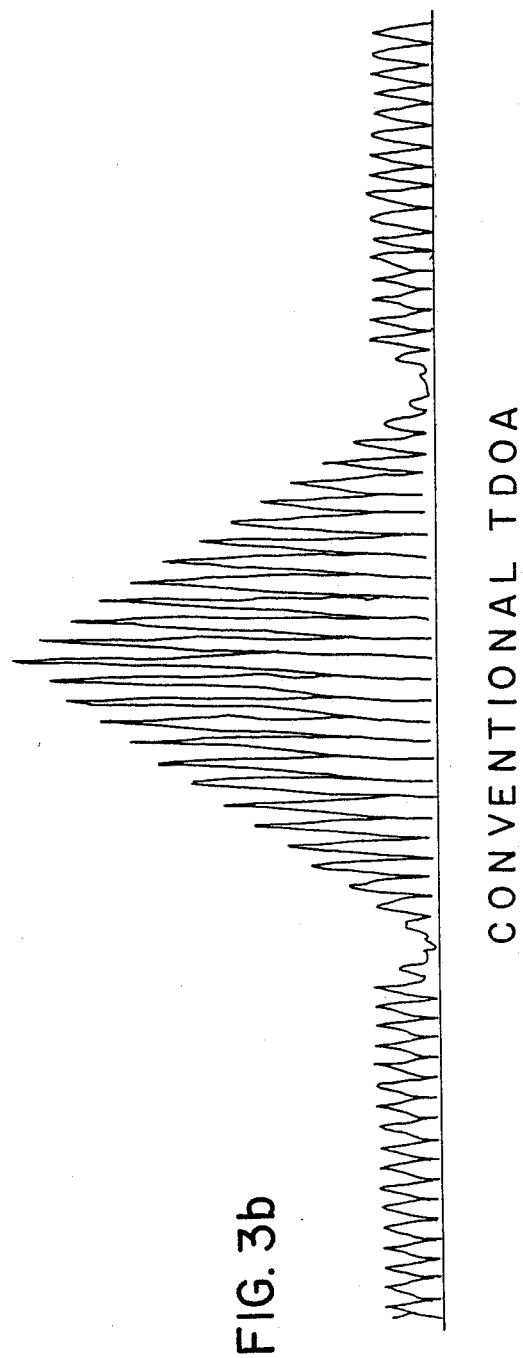

By comparison, FIG. 3b illustrates the corresponding output for a conventional TDOA system. If there had been a narrow-band interferer present, the peak in FIG. 3b may have been distorted or otherwise obscured.

A second embodiment of the invention is shown in FIG. 4. In this embodiment, a coherent light source 26 is directed through a first Bragg cell 28. Also input to the first Bragg cell 28, through electro-optic transducer 30 and 32, are two signals $E_1(t)$ and $E_2(t)$, which are the same as signals $E_1$ and $E_2$ shown in FIG. 1 generated by the first and second antennas in response to the incoming signals. The Bragg cell 28 and light source 26 produce spatial signals $E_1(x)$ and $E_2(x)$ as is known in the art. The values of $E_1(x)$ and $E_2(x)$ presented at any instant include $E_1(x+j)$, for all $0<j<T$, and
$E_2(x+k)$, for all $0<k<T$, where T is the maximum propagation time delay of which the first Bragg cell 26 is capable.

Light from the light source 26 modulated by the signals $E_1$ and $E_2$ is next directed through a second Bragg cell 34 which is positioned at a right angle with respect to the Bragg cell 28. A square wave $E_4(t)$, having a period $1/W_b$ where $W_b$ is the baud rate of the incoming signal of interest, is input to the second Bragg cell 34 via an electro-optic transducer 36. At this point, components of light from the coherent source are modulated by $E_1(x+j)$, $E_2(x+k)$, and $E_3(y+1)$ where $0<1<U$ and where U is the maximum propagation time delay of which the second Bragg cell 34 is capable.

All of the previously mentioned light components impinge on an electro-optic detector 38, where the light components mix to produce $$E_4 = E_1(x+j)*E_2(x+k)*E_3(y+1).$$

The action of the detector 26 is to integrate instantaneous values of $E_4$ and produce voltages $E_5(j-k,1)$ which are estimates of the cyclic crosscorrelation function involving $E_1(t)$ and $E_2(t)$ and the cyclic frequency $W_b$. Specific values of $(j-k)$ correspond to various time delays between the signals $E_1(t)$ and $E_2(t)$. Specific values of 1 correspond to varying the phase of $E_3(t)$. Thus, values on the $(j-k)$ axis correspond to signal delays and consequently lines of position. Values on the 1 axis correspond to phase delays between $E_3(t)$ and the modulating frequency in the incoming signals $E_1$ or $E_2$. A plot of timing phase versus angle of arrival delay is shown in FIG. 5.

Figure 6:
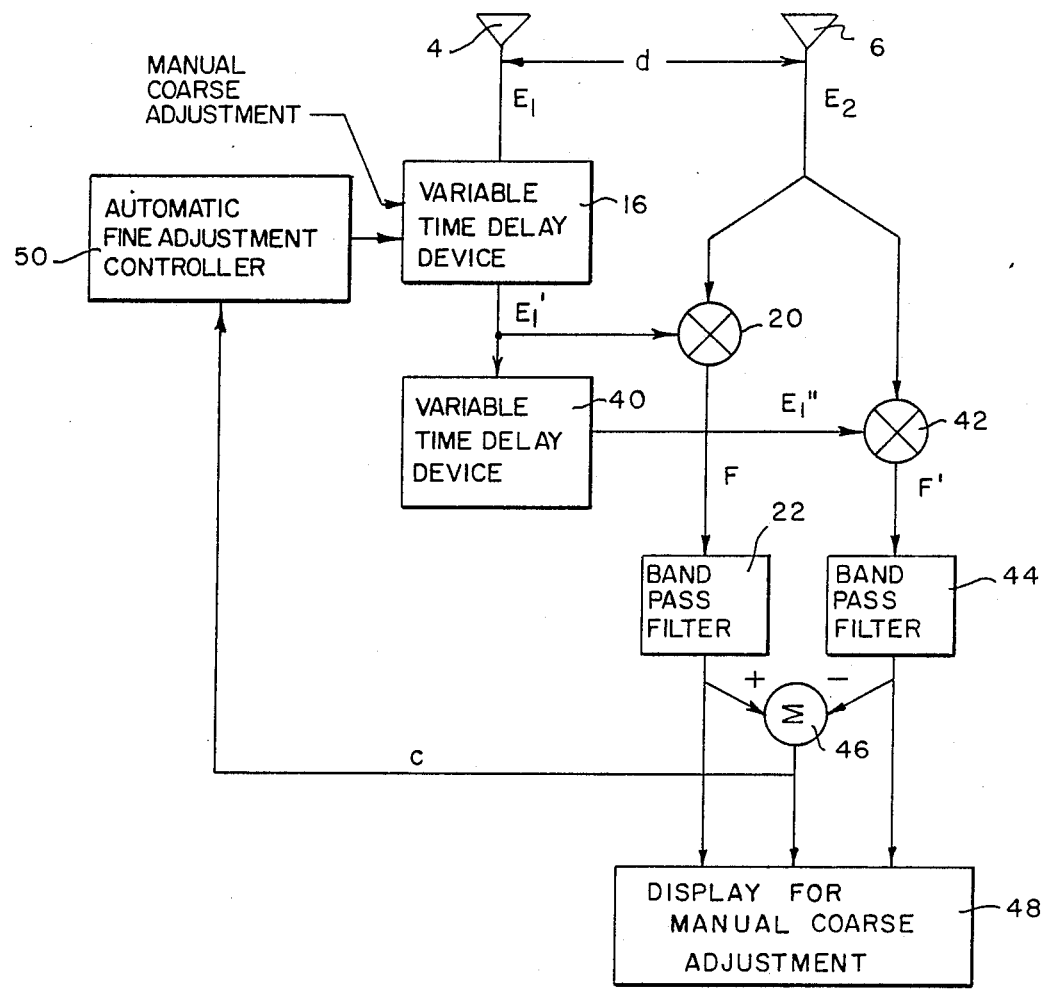
FIG. 6 is a block diagram of the apparatus of FIG. 1 including a second processing circuit and an error correction loop.

Referring now to FIG. 6, the error correction loop for automatic tracking and fine adjustment of the variable time delay used to compute the angle of arrival of the incoming signals will be described. Essentially, this modification comprises a second cyclic crosscorrelation circuit in which the two antenna signals are delayed by an additional amount. The second circuit includes a second variable time delay device 40 which receives the delayed signal $E_1'$ from the first variable time delay device 16. The additionally delayed output signal $E_1''$ from the second variable time delay device 40 is delivered to a second mixer 42 where the signal is mixed with the second signal $E_2$ from the second antenna 6 to produce a second combined output signal F'. This signal is delivered to a second band pass filter 44 of the second cyclic crosscorrelation circuit which is also tuned to pass that portion of the second combined output signal F' at the frequency of the baud rate of the signal of interest. A portion of each of the filtered outputs is delivered to a summation device 46. The difference voltage at the summation device from the first and second cyclic crosscorrelation circuits is used as an error control signal C to adjust the time delay of the first variable time delay device 16. The voltage difference may be displayed by a display device 48 for manual coarse adjustment, and may be delivered to an automatic fine adjustment controller 50 for fine adjustment. More particularly, the delay of the first variable time delay device 16 is adjusted so that the error signal C is zero and the outputs of the two circuits are equal. This occurs when the delays associated with the two cyclic crosscorrelation function circuits straddle the actual delay of interest, as will be discussed with reference to FIGS. 7 and 8.

Figure 7:
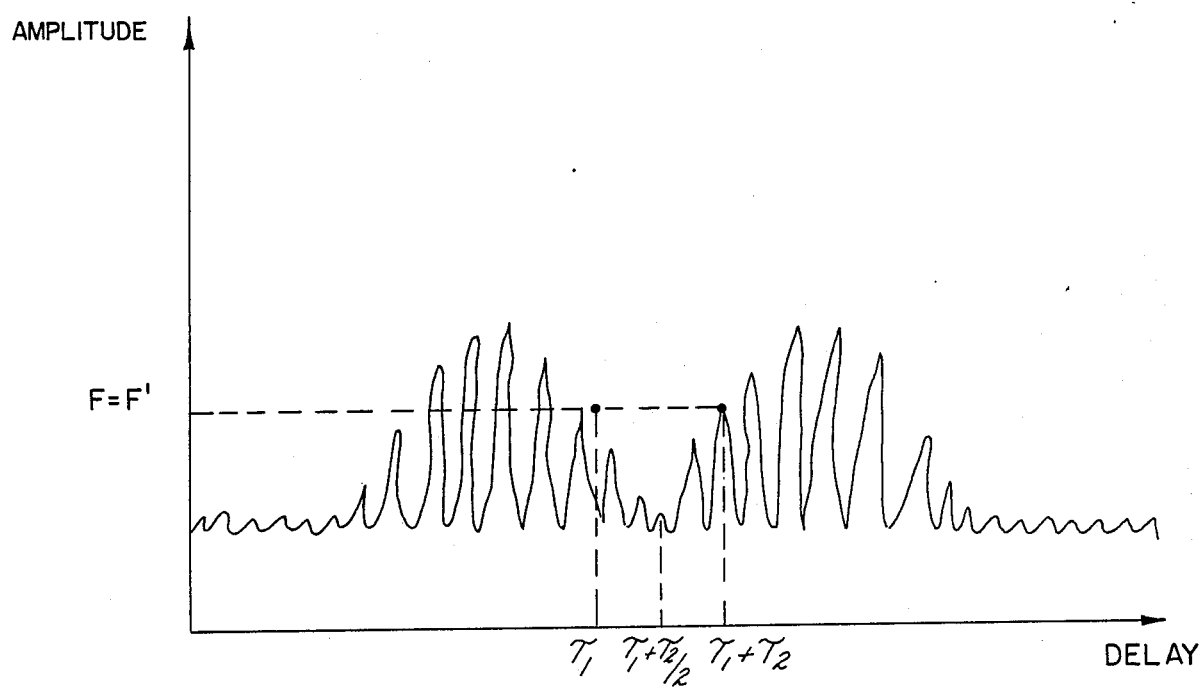
FIG. 7 is a graphical representation of the signal amplitudes detected by the apparatus of FIG. 6 where the amplitudes are equal.
Figure 8:
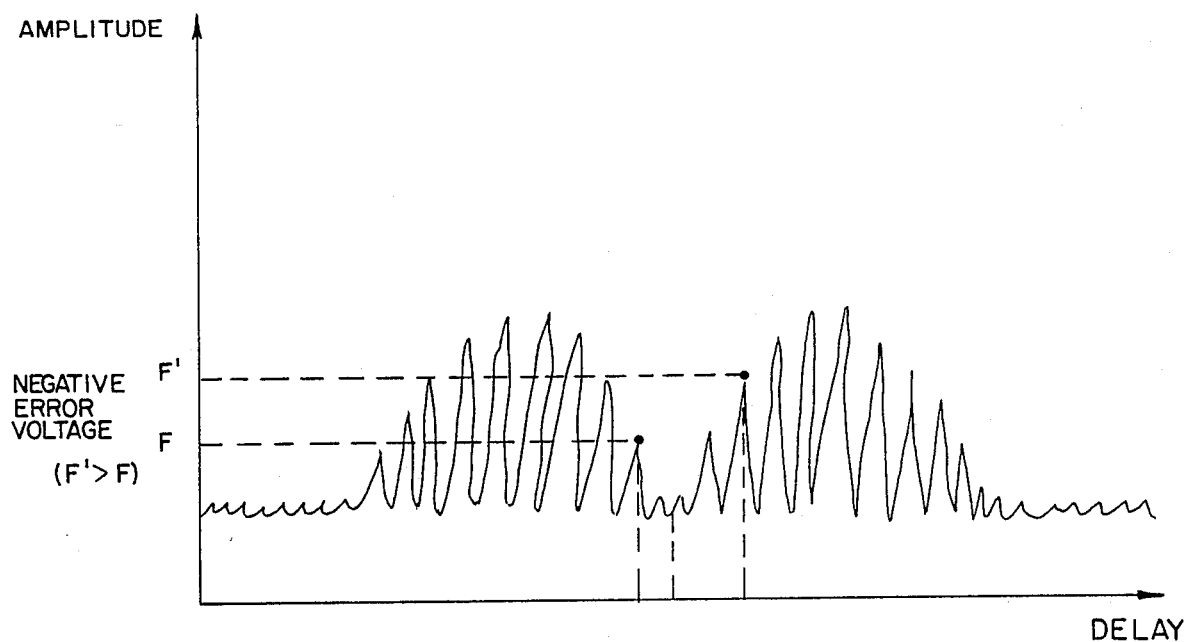
FIG. 8 is a graphical representation of the signal amplitudes of the apparatus of FIG. 6 where the amplitudes are unequal and the error voltage is negative.

As shown in FIGS. 7 and 8, the two circuits each generate a signal level corresponding to a cyclic crosscorrelation amplitude for a specific delay. In FIG. 7, the amplitudes are equal and the delays $\tau_1$ and $\tau_1 + \tau_2$ clearly straddle the null $\tau_1 + \tau_2/2$ corresponding to the bearing of the received signal. In FIG. 8, a negative error voltage is shown where the total delay is too great and the negative error voltage causes the delay controller to decrease the delay of the first device 16.

The cyclic crosscorrelation method and apparatus according to the invention offers a more reliable determination of time difference of arrival in heavy interference than conventional crosscorrelation methods. The improved performance is due to the fact that cyclostationary correlation functions require the existence of a signal modulation component at the examined baud rate if the function is to have a nonzero magnitude. Thus, interference not possessing the proper baud rate must eventually produce an output of zero magnitude at the peak detector. Such outputs cannot affect line of position determinations. This effect is particularly critical to the operation of location systems designed to work with wideband signals of interest because of the greater possibility of interference co-located in frequency with the signal of interest.

While in accordance with the provisions of the patent statute the preferred form and embodiments have been illustrated and described, it will be apparent to those skilled in the art that various changes and modifications can be made without deviating from the inventive concepts set forth above.

What is claimed is:

1. Apparatus for determining the time difference of arrival of signals from a transmitter to determine the geographical location of the transmitter relative to a receiver, comprising
   (a) first and second antennas spaced apart by a fixed distance for receiving modulated signals having a given baud rate from the transmitter, said first and second antennas generating first and second electrical signals corresponding with the received signals, said second signal being delayed in time from said first signal;
   (b) signal processing means connected with the outputs of said first and second antennas for producing an output signal proportional to the time difference between said first and second signals, said signal processing means including
      (1) variable time delay means connected with said first antenna for delaying said first signal by a variable time;
      (2) means connected with said variable time delay means and with said second antenna for mixing said delayed first signal and said second signal to produce a combined signal output; and
      (3) means connected with said mixing means for generating the cyclic crosscorrelation function of said combined signal output in accordance with the transmitted signal baud rate and the variable time delay, whereby as the time delay is varied, the output of said cyclic crosscorrelation function means determines the time difference of arrival of said received signals.

2. Apparatus as defined in claim 1, and further comprising means connected with said signal processing means for determining the line of position of the transmitter in accordance with said time difference of arrival between said first and second signals.

3. Apparatus as defined in claim 2, wherein said cyclic crosscorrelation function generating means includes
   (i) filter means connected with said mixer means for passing the portion of said combined signal output having a frequency corresponding with the baud rate of said ratio signals; and
   (ii) peak detector means connected with said filter means for detecting amplitude peaks in the passed signal, said amplitude peaks corresponding with the transmitted signal baud rate and the variable time delay, whereby as the time delay is varied, the output of said peak detector means comprises two maxima with a null therebetween corresponding with the time difference of arrival of said received signals.

4. Apparatus as defined in claim 3, wherein said filter means comprises a band pass filter.

5. Apparatus as defined in claim 4, wherein said mixing means comprises a multiplier.

6. Apparatus as defined in claim 1, wherein said variable time delay means comprises at least one optical cell.

7. Apparatus as defined in claim 6, and further comprising a coherent light source for delivering an optical signal to said optical cell, said cell also receiving said first and second electrical signals which are modulated by said optical signal.

8. Apparatus as defined in claim 7, and further comprising a second optical cell for receiving said modulated optical signal from said first cell, said second cell also receiving a square wave which is a function of the radio signal baud rate to produce an output.

9. Apparatus as defined in claim 8, and further comprising an optical detector for receiving the output from said second optical cell to produce the composite cyclic correlation function.

10. Apparatus as defined in claim 9, wherein said first and second optical cells comprise Bragg cells, respectively, arranged normal to one another.

11. Apparatus as defined in claim 1, and further comprising an error correction loop connected with said signal processing means for automatic tracking and fine adjustment of said variable time delay means for computing the angle of arrival of said received signals.

12. Apparatus as defined in claim 11, wherein said signal processing means comprises first variable time delay means first mixer means and first cyclic crosscorrelation function generating means, and wherein said error correction loop comprises (1) second variable time delay means connected with said first variable time delay means for delaying said first signal by an additional variable time;

(2) second mixer means connected with said second variable time delay means and with said second antenna for mixing said additionally delayed first signal and said second signal to produce a second combined signal output;

(3) second means connected with said second mixing means for generating the cyclic crosscorrelation function of said second combined signal output;

(4) summing means connected with said first and second cyclic crosscorrelation function generating means for producing a voltage difference signal; and (5) means for applying said voltage difference signal to said first variable time delay means to adjust the first time delay.

13. Apparatus as defined in claim 12, wherein said second cyclic crosscorrelation function generating means includes a band pass filter.

14. A method for determining the time difference of arrival of signals from a transmitter to determine the geographical location of the transmitter relative to a receiver, comprising the steps of (a) receiving modulated signals having a given baud rate from the transmitter at separate locations spaced by a given distance;

(b) generating first and second electrical signals corresponding with the received signals, said second signal being delayed in time from said first signal;

(c) applying a variable time delay to said first signal;

(d) mixing said variable time delayed first signal with said second signal to produce a combined signal output; and (e) generating the cyclic cross correlation function of the combined signal output in accordance with the transmitted signal baud rate and the variable time delay applied to said first signal, whereby as the time delay is varied, the output of said cyclic crosscorrelation function means determines the time difference of arrival of the received signals corresponding with the first and second electrical signals.

15. A method as defined in claim 14, and further comprising the step of determining the line of position of the transmitter in accordance with the time difference of arrival between the received signals.

16. A method as defined in claim 15, and further comprising the steps of (f) applying a second variable time delay to said first signal;

(g) mixing said second variable time delayed first signal with said second signal to produce a second combined signal output;

(h) generating the cyclic crosscorrelation function of the second combined signal output;

(i) obtaining the difference between the amplitudes of said first and second cyclic crosscorrelation functions; and (j) adjusting the initial variable time delay applied to said first signal in accordance with the amplitude difference between said first and second cyclic crosscorrelation functions.

17. A method of determining the time difference of arrival of digitally modulated electromagnetic signals having a given baud rate in a heavy interference environment to determine the line of position of the signal transmitter, comprising the steps of (a) receiving the transmitted signals at spaced locations to provide two received electrical signals;

(b) generating an estimate of the cyclic crosscorrelation function of said two received signals;

(c) adding a variable time delay to at least one of the received signals;

(d) multiplying said two received signals to produce a composite electrical signal; and (e) generating a signal proportional to the electrical energy contained in a frequency band corresponding with the signal baud rate and the immediately surrounding frequencies thereof, said generated signal corresponding with the time difference of arrival of said two signals which is a function of the line of position of the transmitter.

* * * * *